United States Patent [19]

Artin

[11] Patent Number: 4,783,173
[45] Date of Patent: Nov. 8, 1988

[54] COMBINED WASHER AND COLLAR FOR SUPPORTING A MOTOR

[75] Inventor: Robert L. Artin, Richfield, Wis.

[73] Assignee: Sunbeam Corporation, Downers Grove, Ill.

[21] Appl. No.: 113,542

[22] Filed: Oct. 26, 1987

[51] Int. Cl.[4] ............................................. B01F 7/16
[52] U.S. Cl. .................................. 366/314; 366/205; 403/194
[58] Field of Search ............... 366/348, 349, 601, 314, 366/279, 285, 286, 241, 205, 206, 207; 403/194, 197, 199, 238, 239

[56] References Cited

U.S. PATENT DOCUMENTS

| | | | |
|---|---|---|---|
| 2,913,230 | 11/1959 | Hutchins | 366/205 |
| 3,447,000 | 5/1969 | Dugan | 366/205 |
| 3,929,031 | 12/1975 | Webb | 403/197 |
| 4,509,878 | 4/1985 | Bryson | 403/197 |

Primary Examiner—Robert W. Jenkins
Attorney, Agent, or Firm—Neil M. Rose

[57] ABSTRACT

A combined washer and collar for supporting a motor with respect to a housing, the housing having downwardly extending shouldered bosses which receive the washer and collar units which have tabs to facilitate preassembly to a motor frame.

16 Claims, 2 Drawing Sheets

COMBINED WASHER AND COLLAR FOR SUPPORTING A MOTOR

BACKGROUND OF THE INVENTION

This invention relates generally to the means for supporting a motor in a blender appliance and, more specifically, relates to a combined washer and collar which supports a motor with respect to a housing in a manner that allows the motor to shift laterally with respect to its axis.

The typical food blending appliance as used by people involved in food preparation for the last several decades has included a power unit or base which supports a vessel in which blades are mounted to cut, chop and mix food and liquids placed in the vessel. The motor mounted in the base is positioned with its armature shaft in a vertical position extending through the top of the housing where it is provided with a means for detachably coupling the armature shaft to the blade assembly carried in the bottom of the vessel. The motor drives the blade assembly directly at relatively high speeds, making it important that the armature shaft and the connection with the blade assembly of the vessel be accurately aligned to eliminate vibrations which might be caused by any eccentricity.

The lower end of the blender vessel typically has an accurately dimensioned portion which fits into a support ring or similar construction mounted on the top of the power unit housing. However, even with the blender vessel accurately located with respect to the motor housing, there is some tendency for there to be misalignment between the vertical axis of the motor armature and the axis of the rotatable support for the blades in the blender vessel. Accordingly, it has been known in the art for many years to provide the motor with a mounting with respect to the housing such that it may shift laterally a small amount to accomplish the aligning of the axis of the armature with the axis of the rotatable blade assembly. This mounting has typically included resilient wave washers which restrain the motor mounting pads from vibrating, but still allow movement of the motor pads in a horizontal plane. The wave washers which were conventionally applied above and below the pads on the motor frame were difficult to sort and assemble to the various motor mounting pads, such difficult presenting increased problems when attempts were made to automate the assembly of the motor to the power unit housing.

SUMMARY OF THE INVENTION

The present invention involves a one-piece plastic member which replaces the wave washers which were formerly used to support the motor frame mounting pads with respect to the power unit housing. The plastic member serves as a combined washer and collar on each of the motor frame mounting pads and is easily assembled to the motor by automated means, thereafter providing the resilient engagement against the upper and lower faces of each of the motor pads in connection with their mounting to the power unit housing.

Accordingly, it is an object of the present invention to provide an improved mounting means for mounting the motor of a blender with respect to its housing.

It is another object of the present invention to provide an improved washer for resiliently supporting the motor mounting pads on the motor frame with respect to the motor housing.

It is still another object of the present invention to provide combined washers and collars for each mounting pad and support for a blender motor to support the motor for a limited movement in a horizontal direction.

Further objects and advantages of the instant invention will become obvious to one skilled in the art as the following description proceeds, and the features of novelty which characterize the invention will be pointed out in the claims annexed to and forming a part of the specification.

Figure 1:
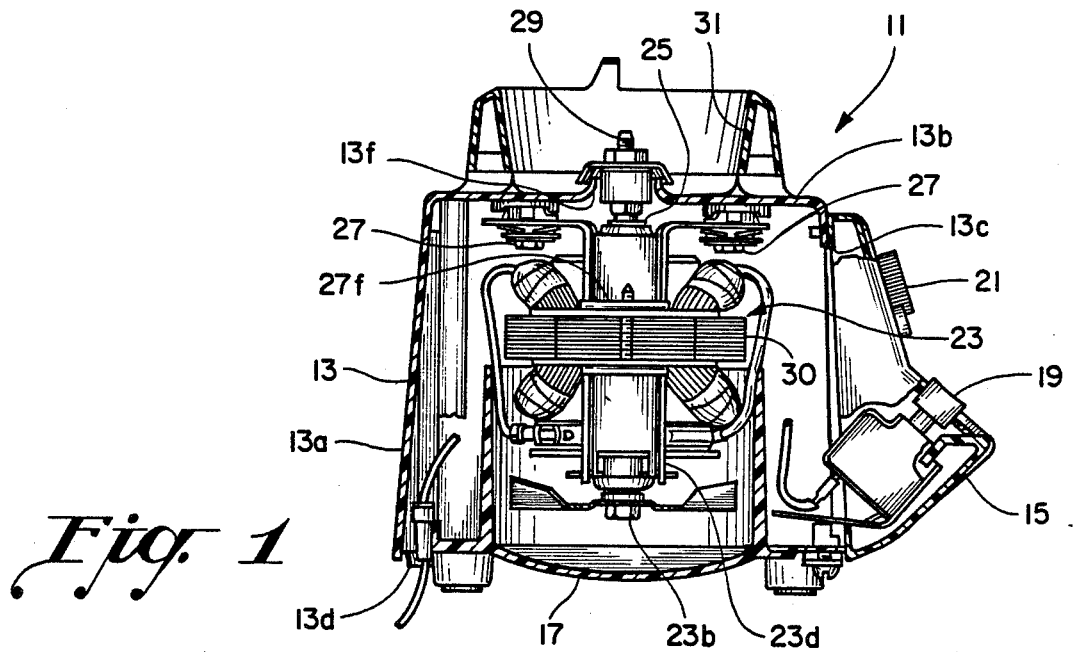
FIG. 1 is a vertical sectional view of a food blender base or power unit embodying my invention.

Referring to the drawings, there is shown a blender power unit or base in FIG. 1 designated generally by reference numeral 11. The power unit 11 includes an inverted cup-shaped housing 13 which has side walls 13a, a top wall 13b and a front opening 13c in which a control module 15 is mounted. The housing 13 also has a downwardly facing opening 13d in which there is received a closure member 17. The control module 15 includes speed selection switches 19 and an on/off switch 21 both of which control the operation of a motor 23 supported within the housing 13.

Figure 5:
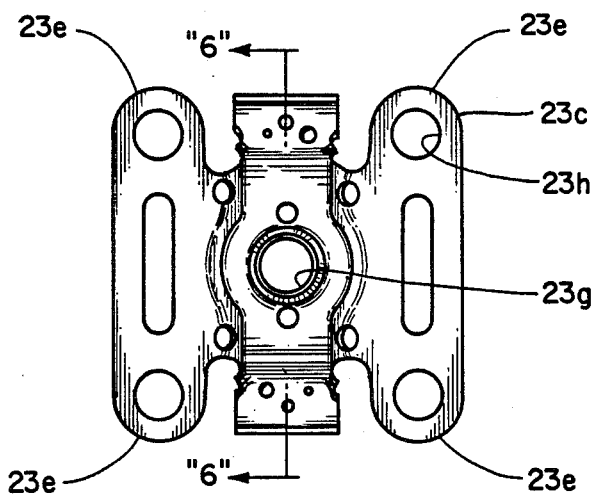
FIG. 5 is a top plan view of the upper motor frame of the blender base of FIG. 1.
Figure 6:
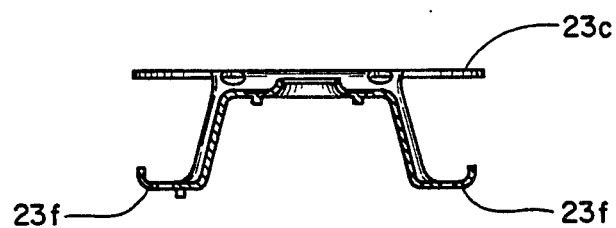
FIG. 6 is a sectional view taken on line 6—6 of FIG. 5.

The motor 23 includes a field 23a, an armature (not shown) which is supported by an armature shaft 23b, the armature shaft being journaled in bearings carried by an upper frame member 23c and a lower frame member 23d. The upper frame 23c is shown in FIGS. 5 and 6 and includes four motor mounting pads 23e which serve to support the motor 23 with respect to the housing 13. The upper frame member 23c also includes support portions 23f which extend into engagement with the field 23a and are secured by an assembly means (not shown). The central portion of the upper frame 23c is formed with an opening 23g within which an upper armature bearing 25 is secured. Each of the pads 23e in the upper frame member 23c is formed with an opening 23h which is designed to receive an assembly screw 27.

The top wall 13b of the housing 13 is formed with an opening 13f through which the upper end of the armature shaft extends and on which is mounted a coupling 29. The coupling 29 may take the form of any one of a number of known couplings used for blender appliances. In this particular case, the coupling includes a square shaft which is adapted to be received in a corresponding coupling member having a square recess associated with the blade assembly of the blender vessel.

Figure 2:
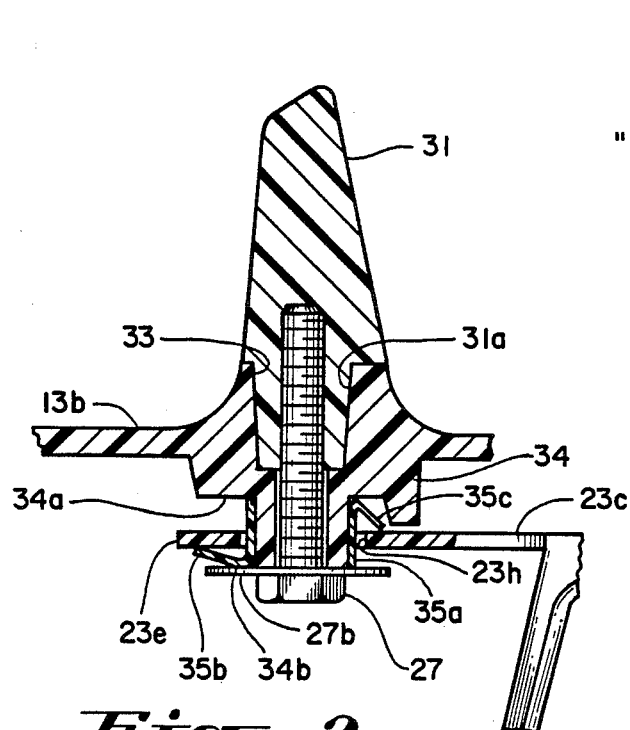
FIG. 2 is an enlarged, fragmentary sectional view taken through one of the mounting screws of the motor of the blender of FIG. 1.

To support the blender vessel with respect to the power unit or base 11, there is provided a mounting ring 31 which is secured to the housing 13 by the four mounting screws 27. As is best shown in FIG. 2, the vessel support ring 31 is formed with a plurality of downwardly extending bosses 31a, only one of which is shown in FIG. 2. Each of these bosses extend into a recess 33 formed in the top wall 13b of the housing 13. The engagement between the bosses 31a and the recesses 33 locate the support ring 31 accurately with respect to the housing 13.

Figure 3:
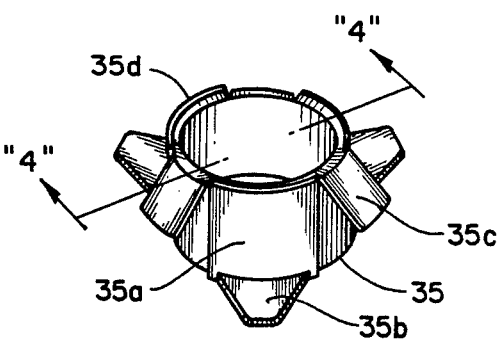
FIG. 3 is a perspective view of the motor support collar embodying my invention and shown in the sectional views of FIGS. 1 and 2.

The portion of the housing 13 immediately below the top wall 13b is formed with mounting bosses 34 which include annular shoulders 34a and cylindrical portions 34b. In order to mount the motor 23 with respect to the housing 13 in such a way that it may move laterally to align the armature shaft with the coupling portion on the blender vessel, the motor 23 is supported with respect to the housing 13 by a combined washer and collar 35 which is best shown in FIG. 3. There is a combined washer and collar 35 secured to each of the motor support pads 23e being received in the holes 23h.

Figure 4:
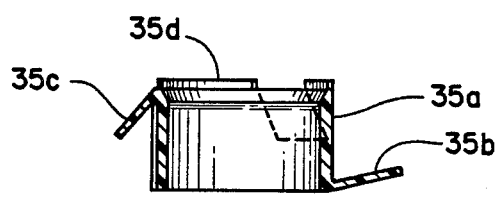
FIG. 4 is a sectional view of the motor support collar of FIG. 3.

Each combined washer and collar 35 includes a cylindrical portion 35a, lower tabs 35b and upper tabs 35c, the tabs extending respectively from the lower and upper ends of the cylindrical portion 35a and being inclined upwardly and downwardly, respectively, as shown best in FIGS. 2 and 4. The three upper tabs 35c and the three lower tabs 35b are equally spaced around the periphery of the cylindrical portion 35a. Positioned at the top of the cylindrical portion 35a and between the upper tabs 35c there are three ribs 35d, which are of less thickness than the cylindrical portion 35a and are intended to be at least partially crushed to assure a tight fit in spite of tolerances between the assembly screw 27 and the annular shoulder 35a as will be explained in greater detail below. To facilitate molding of the washer/collar 35, the upper tabs 35c are positioned between the lower tabs 35b when viewed axially of the cylindrical portion 35a. Since the weight of the motor 23 rests on and is supported by the lower tabs 35b, they are heavier and less flexible than the upper tabs 35c. The lower tabs 35b are somewhat triangular in shape, having a broad base and tapering to the narrow end to make them less flexible and providing less friction between the tip of the tab and the motor support pads 23e. This arrangement permits the motor to shift laterally for shaft alignment more easily.

As may be noted from FIG. 2, the diameter of the holes 23h in the mounting pads 23e are of such size that there is a substantial clearance between the outer wall of the cylindrical portion 35a. In addition, the inside diameter of the cylindrical portion 35a is loosely spaced with respect to the cylindrical portion 34b of the boss 34.

The assembly of the combined washer and collar 35 to the upper motor frame 23c is accomplished by merely inserting it upwardly into the hole 23h in one of the mounting pads 23e. The upper tabs 35c are sufficiently resilient to fold against the side wall of the cylindrical portion 35a, thus permitting the upper end of the washer/collar 35 to pass through the opening 23h until the upper tabs 35c clear the upper surface of the pad 23e at which time the upper tabs 35c spring outwardly to the position shown in FIG. 2. In this position, the tabs 35c engage the upper surface of the motor pads 23e, thereby preventing disassembly therefrom until the tabs are deformed inwardly. In this assembled position the lower tabs 35b engage the under side of the pads 23c, the upper and lower tabs being so dimensioned to apply a slight pressure on the opposite sides of the pad 23c.

With the four washer/collars 35 assembled to the upper motor frame 23c, the entire assembly of the motor and the washer/collars 35 may then be inserted upwardly into the housing 13 until the washer/collars 35 engage the bosses 34 in the manner shown in FIG. 2. The assembly screws which include integral washer portions 27a are then inserted into the bosses 34 and threaded into the support ring 31. When the assembly screws 27 are tightened down against the lower end of the cylindrical portions 34b of the boss 34, the ribs 35d are partially crushed taking up any tolerances so that there will be no rattling or vibrations between the washer/collar 35 and the housing 13. In the assembled position, as shown in FIG. 2, the motor 23 and its upper frame 23c may shift in a horizontal plane to insure proper alignment of the armature shaft 23b with the coupling on the blender vessel.

The plastic material used for the washer/collar 35 in a constructed embodiment was a Celanese material identified as M-904 which is a polyester with elastoner, which is 30% glass-filled. The glass filling was found to be necessary to increase the strength of the part so that it would pass the shock or impact tests to which household appliances of this type are subjected.

I claim:

1. A blender comprising a housing having a vessel support on its uppermost portion, a motor supported within said housing and having a drive coupling which extends to the exterior of said housing for engagement with a vessel carried by said vessel support, a motor support bracket fastened rigidly to said motor and having pads disposed in a common horizontal plane with each having a top and bottom surface and an opening the axis of which is normal to said plane, a support collar in each opening having a cylindrical portion of less diameter than said opening and having retaining tabs extending from opposite ends of said cylindrical portion into engagement with the top and bottom surfaces of each said pad, and means securing said cylindrical portions to the inside of said housing with said motor and bracket being permitted limited horizontal movement.

2. The blender of claim 1 wherein said means securing said cylindrical portions comprises an elongated fastener which extends through an opening in said housing into engagement with said vessel support to secure said vessel support to said housing.

3. The blender of claim 1 wherein said housing includes a horizontally disposed top wall having a plurality of vertically disposed bosses depending therefrom within said housing, each said support collar being received on one of said bosses, said cylindrical portion of said support collar having a length and inside diameter substantially equal to the length and outside diameter of said bosses.

4. The blender of claim 3 wherein each said support collar includes outwardly and upwardly projecting lower tabs on the lower end of said cylindrical portion, said lower tabs engaging said pads to support said motor, each said support collar including outwardly and downwardly projecting upper tabs on the upper end of said cylindrical portion, said upper tabs engaging said top surface of said pads to retain said support collars assembled to said motor support bracket.

5. The blender of claim 4 wherein said upper tabs are capable of being flexed against said cylindrical portion to permit insertion of said support collar into said opening in said pad.

6. The blender of claim 5 wherein each said support collar is provided at the top of said cylindrical portion with a thin flange which is partially crushed on assembly between said housing and said securing means to eliminate axial movement between said support collar and said boss.

7. A collar for supporting a motor in a housing comprising a cylindrical portion having a first end supporting a plurality of radially extending circumferentially disposed tabs which are equally spaced from each other, said cylindrical portion having another end axially spaced from said first end, said other end supporting another plurality of radially extending circumferentially disposed tabs which are angled toward said first end, said tabs on said other end being disposed between said tabs on said first end as said collar is viewed axially of said cylindrical portion.

8. A plastic washer/collar comprising a sleeve portion having an upper end and a lower end and being adapted to be disposed with its axis vertically and extending through a circular opening provided in a motor mounting horizontally disposed bracket of a small counter-top type kitchen appliance and over a motor mounting boss depending from the appliance housing, said sleeve portion having a first series of integral flexible tabs extending radially from its lower end and angled upwardly for engagement with the underside of said motor mounting bracket and a second series of relatively smaller integral flexible tabs extending radially from its upper edge and angled downwardly for engagement with the upper side of said motor mounting bracket, said smaller second series of tabs permitting snap insertion of said washer/collar through said bracket opening and both series of tabs then cooperating to retain said washer/collar in said bracket opening as a subassembly prior to attachment of said bracket to said appliance housing, 9. The plastic washer/collar of claim 8 wherein said tabs in said first series are wider at the connection to said sleeve portion tapering toward the end remote from said sleeve portion, said second series of tabs being equal in number to the first series of tabs and being untapered.

10. The plastic washer/collar of claim 9 wherein said tabs in said second series are positioned between said tabs in said first series when viewed on the axis of said sleeve portion to facilitate molding said tabs integrally with said sleeve portion.

11. The plastic washer/collar of claim 8 wherein said sleeve portion is formed with an integral annual extension on said upper end of said sleeve portion, said extension protruding above said second series of tabs and having a thickness substantially less than the thickness of the wall of said sleeve portion.

12. The plastic washer/collar of claim 8 wherein said second series of tabs are sufficiently flexible to permit each tab in said second series to be deflected downwardly against the outside of the wall defining said sleeve portion.

13. A power unit for a blender comprising an inverted cup-shaped housing having a top wall which supports a motor from the lower surface thereof, said motor including an upper and lower bearing and a field, a vessel support ring mounted on the upper surface of said top wall to support a blender jar having a cutting and mixing assembly adapted to be driven by said motor, said motor being disposed within said housing with said armature shaft disposed vertically, a combined motor frame and support member which supports said upper armature bearing and said field, said combined frame and support member having a plurality of support pads disposed in a plane normal to the axis of said armature shaft, a combined washer and collar received in openings in each of said pads, each said combined washer and collar having a sleeve portion received in said openings and integrally formed tabs which engage upper and lower surfaces of said pads to retain said washer and collar with respect to said combined motor frame and support member, said combined washer and collar being rigidly secured to said top wall and mounting said motor for limited horizontal displacement so that said armature shaft may align itself in driving connection with said assembly.

14. The power unit for a blender as set forth in claim 13 wherein said top wall is formed on said lower surface with a plurality of depending bosses which receive said sleeve portions of said combined washer and collar, assembly means extending through said bosses into engagement with said vessel support ring to secure both said combined washer and collars and said ring to said top wall.

15. The power unit for a blender as set forth in claim 14 wherein said openings in said pads are substantially larger than said sleeve portions of said combined washer and collars, said tabs having sliding engagement with said upper and lower surfaces of said pads but not restricting movement of said motor in a horizontal direction for aligning said driving connection.

16. The combination of claim 14 wherein said assembly means comprises a screw having a body which extends through a hole in said boss and top wall into threaded engagement with said ring and a head having a shoulder which engages the lower end of said boss and clamps said sleeve portion against said top wall.

* * * * *